US007817999B2

(12) United States Patent
Tang et al.

(10) Patent No.: US 7,817,999 B2
(45) Date of Patent: Oct. 19, 2010

(54) METHOD AND SYSTEM FOR IMPLEMENTING ROAM RESTRICTION

(75) Inventors: Xinhong Tang, Guangdong (CN); Shiqian Li, Guangdong (CN); Hui Cao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 725 days.

(21) Appl. No.: 11/525,369

(22) Filed: Sep. 22, 2006

(65) Prior Publication Data

US 2007/0060122 A1    Mar. 15, 2007

Related U.S. Application Data

(63) Continuation-in-part of application No. PCT/CN2005/001636, filed on Sep. 30, 2005.

(30) Foreign Application Priority Data

Sep. 30, 2004    (CN) .................... 2004 1 0084840

(51) Int. Cl.
 *H04Q 7/20* (2006.01)
(52) U.S. Cl. .................. 455/432.1; 370/331; 455/436; 455/432.3; 455/410; 455/433; 455/424
(58) Field of Classification Search .......... 455/432, 455/435, 410, 411, 433, 422, 517, 524, 424, 455/436, 432.1, 432.3, 432.2; 370/331
See application file for complete search history.

(56) References Cited

U.S. PATENT DOCUMENTS 5,497,412 A * 3/1996 Lannen et al. ........... 455/432.2
5,603,095 A   2/1997 Uola (Continued)

FOREIGN PATENT DOCUMENTS

CN    1114851 A    1/1996

(Continued)

OTHER PUBLICATIONS

"Technical Specification of 800MHz CDMA Digital Cellular Mobile Telecommunication Network Mobile Application Par," YD/T 1031-1999, Dec. 27, 1999.

(Continued)

*Primary Examiner*—Vincent P Harper
*Assistant Examiner*—Khalid Shaheed
(74) *Attorney, Agent, or Firm*—Conley Rose, P.C.; Grant Rodolph

(57)    ABSTRACT

A method for implementing roam restriction and a system thereof are disclosed in the present invention, by setting up a list of areas where the terminal is allowed to roam. The method includes: the terminal sends a wireless service request to the mobile switching center on the wireless communication network side, wherein the request carries the information of at least one cell currently activated by this terminal; the mobile switching center determines whether there is a cell among the at least one cell currently activated by this terminal, whose cell information is included in the list of areas where the terminal is allowed to roam, if yes, executes current wireless service for this terminal; otherwise, rejects to execute current wireless service for this terminal. With this method, when the number of the cells is increased or changed, there is no need to modify the relationship between the associated IMSI/MIN and the cells or modify the IMSI/MIN of the terminals one by one under the circumstance of migration. Furthermore, since the information of all cells currently activated by the terminal is obtained by the wireless communication network side, when the terminal is located in an overlapped area covered by two cells, this method for implementing roam restriction on the terminal can still be used.

18 Claims, 5 Drawing Sheets

U.S. PATENT DOCUMENTS

| | | | |
|---|---|---|---|
| 6,032,044 A * | 2/2000 | Shannon et al. | 455/433 |
| 6,230,017 B1 * | 5/2001 | Andersson et al. | 455/456.6 |
| 6,301,475 B1 | 10/2001 | Saarela | |
| 6,397,064 B1 | 5/2002 | Bridges et al. | |
| 6,411,807 B1 * | 6/2002 | Amin et al. | 455/432.3 |
| 6,549,787 B1 * | 4/2003 | Ravi | 455/525 |
| 6,947,745 B1 | 9/2005 | Kido | |
| 7,099,675 B2 * | 8/2006 | Keutmann et al. | 455/456.1 |
| 2002/0052213 A1 * | 5/2002 | Ko et al. | 455/466 |
| 2003/0039360 A1 | 2/2003 | Younis | |
| 2003/0126195 A1 | 7/2003 | Reynolds et al. | |
| 2003/0225884 A1 | 12/2003 | Hayden | |
| 2004/0072578 A1 | 4/2004 | Keutmann et al. | |

FOREIGN PATENT DOCUMENTS

| | | |
|---|---|---|
| CN | 12277698 A | 9/1999 |
| CN | 1291851 A | 4/2001 |
| CN | 1482822 A | 3/2004 |
| CN | 1491520 A | 4/2004 |
| CN | 1493167 A | 4/2004 |
| CN | 1527521 A | 9/2004 |
| CN | 100384294 C | 4/2008 |
| EP | 1 079 649 A1 | 2/2001 |
| WO | WO 95/09512 | 4/1995 |
| WO | WO 02/44827 A2 | 6/2002 |
| WO | 02065808 A1 | 8/2002 |
| WO | WO 2004/034623 A2 | 4/2004 |

OTHER PUBLICATIONS

Foreign communication from a counterpart application, PCT application PCT/CN2005/001636, English Translation Written Opinion dated Dec. 8, 2005, 3 pages.

* cited by examiner

METHOD AND SYSTEM FOR IMPLEMENTING ROAM RESTRICTION

CROSS-REFERENCE TO RELATED APPLICATIONS

This application is a continuation-in-part application of International Application No. PCT/CN2005/001636, filed Sep. 30, 2005, which claims priority in Chinese Application No. 2004-10084840.7, filed Sep. 30, 2004, both of which are entitled "Method and System for Implementing Roam Restriction". The full disclosure of these applications are hereby incorporated by reference.

FIELD OF THE TECHNOLOGY

The present invention generally relates to wireless communication networks, more particularly to method and system for implementing roam restriction in wireless communication networks.

BACKGROUND OF THE INVENTION

At present, there are many wireless communication network operators, who are only granted the right to operate the wireless communication network other than the mobile network. In some strictly restricted areas, terminals cannot roam beyond the area of the cell or of the coverage of single base station or multi base stations that are covered by this wireless communication network. If a terminal roams beyond the coverage, the service could not be provided for this terminal. This is called roam restriction on a terminal.

At present, the method for implementing roam restriction on a terminal could be roughly described as the following: a wireless communication network is divided into many cells and each cell thereof is identified by a number segment. When a terminal on the wireless communication network side subscribes for the permission to roam in a certain cell, the network side will allocate to the terminal International Mobile Subscriber Identity (IMSI) or Mobile Identity Number (MIN) with the number segment corresponding to this cell; when the subscribed terminal starts a call to wireless communication network side or is called, the IMSI/MIN of this terminal will be provided to the wireless communication network side. According to the number segment carried in the terminal's IMSI/MIN, the wireless communication network side can determine the cells the terminal is allowed to roam and further determines whether the roam restriction should be performed on this terminal according to the current cell where the terminal is located, if yes, the wireless communication network side will reject current calling service or being called service; otherwise, the wireless communication network side will process current calling service or being called service.

The method for implementing roam restriction on a terminal has the following disadvantages:

1. due to network optimization, capacity expansion or migration of wireless communication network, the number of the cells will be increased or changed, accordingly it is inevitable to make modification on the wireless communication network side to the relationship between the associated number segments and the cells, for the circumstance of migration, it is also needed to modify the IMSI/MIN of the associated terminals. However, such modification performed one by one is troublesome and is not suitable for commercial applications;

2. a terminal, which is located in the overlapped area covered by both cells, may not be able to start a call or be called. This is because one of the two cells restricts the terminal from roaming in this area, while the other cell allows the terminal to roam. In this case, the terminal will probably receive the calling signal from the roam-restricted cell during a period of time, consequently the terminal cannot call or be called.

SUMMARY OF THE INVENTION

The present invention is embodied in method and system for implementing roam restriction in wireless communication networks, with which when the number of the cells is increased or changed, there is no need to modify the relationship between the associated IMSI/MIN and the cells or modify the IMSI/MIN of the terminals one by one under the circumstance of migration. Moreover, when the terminal is located in an overlapped area covered by both cells, the method and the system for implementing roam restriction on the terminal can still be used.

A method for implementing roam restriction in a wireless communication network, a list of areas where the terminal is allowed to roam is set up, the method includes:

the terminal sends a wireless service request to the Mobile Switching Center (MSC) on the wireless communication network side, wherein the request carries the information of at least one cell currently activated by this terminal;

the MSC determines whether the information of at least one cell currently activated by this terminal carried in the request is included in the list of areas where the terminal is allowed to roam, if yes, provides current wireless service for this terminal; otherwise, rejects to provide current wireless service.

A system for implementing roam restriction, includes: interconnected Base Station Controller (BSC) and Mobile Switching Center (MSC), wherein the BSC sends to the MSC a terminal wireless service request message carrying the information of at least one cell currently activated by the terminal; the MSC receives the terminal wireless service request message and determines whether the at least one cell currently activated by the terminal is included in the list of areas where the terminal is allowed to roam, if yes, the MSC will send to the BSC a message to execute the requested service; otherwise, the MSC will send to the BSC a message to reject the requested service.

The system may further include a Home Location Register (HLR) which is connected with the MSC and is provided to store the list of areas where the terminal is allowed to roam, for the MSC to obtain the list of areas where the terminal is allowed to roam through a message sent by the HLR. Furthermore, the system may include a Visitor Location Register (VLR) which is connected with the MSC and is provided to store the list of areas where the terminal is allowed to roam.

In general, a list of areas where the terminal is allowed to roam is set up and stored on the wireless communication network side. When the terminal requires a service, according to this list of areas where the terminal is allowed to roam, the wireless communication network side determines whether the area where the terminal is currently located is included in the list of areas where the terminal is allowed to roam, and determines whether to perform the roam restriction. This method implements roam restriction on a terminal, and when the number of cells is increased or changed, it is needed to modify the list of areas where the terminal is allowed to roam, without the trouble as in the prior art of modifying the relationship between the associated IMSI/MIN and the cells or modifying the IMSI/MIN of the terminals one by one under the circumstance of migration. Furthermore, when a terminal requires a service in an overlapped area covered by two cells, the wireless communication network side will receive the cell information of all the currently activated cells rather than that of just one cell, so that the service is accessible as long as one of the cells does not restrict the terminal from roaming and that the terminal avoids the service forbiddance because of receiving the calling signal from a cell that restricts the terminal from roaming. Therefore, when the number of the cells is increased or changed, there is no need to modify the relationship between the associated IMSI/MIN and the cells or modify the IMSI/MIN of the terminals one by one under the circumstance of migration, and furthermore, the method for implementing roam restriction on the terminal can still be used when the terminal is in an overlapped area covered by two cells.

DETAILED DESCRIPTION OF THE EMBODIMENTS

To make the present invention's technical scheme clearer and advantages more understandable, the present invention will be described in detail hereinafter with reference to the accompanying drawings as well as specific embodiments.

In general, a list of areas where the terminal is allowed to roam is set up and stored on the wireless communication network side. This list of areas where the terminal is allowed to roam can be stored in a Home Location Register (HLR) on the wireless communication network side. This list of areas where the terminal is allowed to roam can be personal to the terminal, specifically represented as the corresponding relationship between the terminal identifier and those areas where the terminal is allowed to roam. When a terminal requires a service, according to the list of areas where the terminal is allowed to roam, the wireless communication network side will determine whether the area where this terminal is currently located is included in the determined list of areas, if not, the wireless communication network side will reject to process the service required by the terminal; if yes, the wireless communication network side will process the service required by this terminal.

Figure 1:
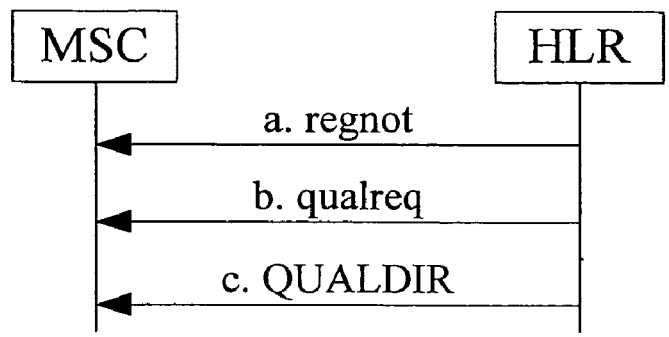
FIG. 1 is a schematic diagram illustrating the procedure of sending the list of areas where the terminal is allowed to roam stored in Home Location Register (HLR) to Mobile switching center (MSC), according to an embodiment of the present invention.

In order to implement roam restriction on this terminal, the HLR sends the stored list of areas where the terminal is allowed to roam to the Mobile switching center (MSC) of the wireless communication network side that serves this terminal, wherein there are three situations for the HLR to send the stored list of areas where the terminal is allowed to roam to the MSC, as shown in FIG. 1, respectively being:

a. after the terminal sends a location registration (REG-NOT) to the MSC on the wireless communication network side, the MSC that serves this terminal will send a location registration to the HLR. The HLR returns the MSC a location registration response message (regnot) carrying a list of areas where the terminal is allowed to roam, the MSC stores the list of areas where the terminal is allowed to roam thereof in the Visitor Location Register (VLR) that the MSC belongs to;

b. the MSC that serves this terminal will send a qualification request (QUALREQ) to the HLR. The HLR returns MSC a qualification request response message (qualreq) carrying a list of areas where the terminal is allowed to roam, MSC stores the list of areas where the terminal is allowed to roam thereof in the Visitor Location Register (VLR) that the MSC belongs to;

c. when the list of areas where the terminal is allowed to roam is modified in the HLR, the HLR needs to send a qualification direction message (QUALDIR) to the MSC that serves this terminal, wherein the message carries the updated list of areas where the terminal is allowed to roam, the MSC that serves the terminal stores the updated list of areas where the terminal is allowed to roam thereof in the Visitor Location Register (VLR) that the MSC belongs to.

Figure 2:
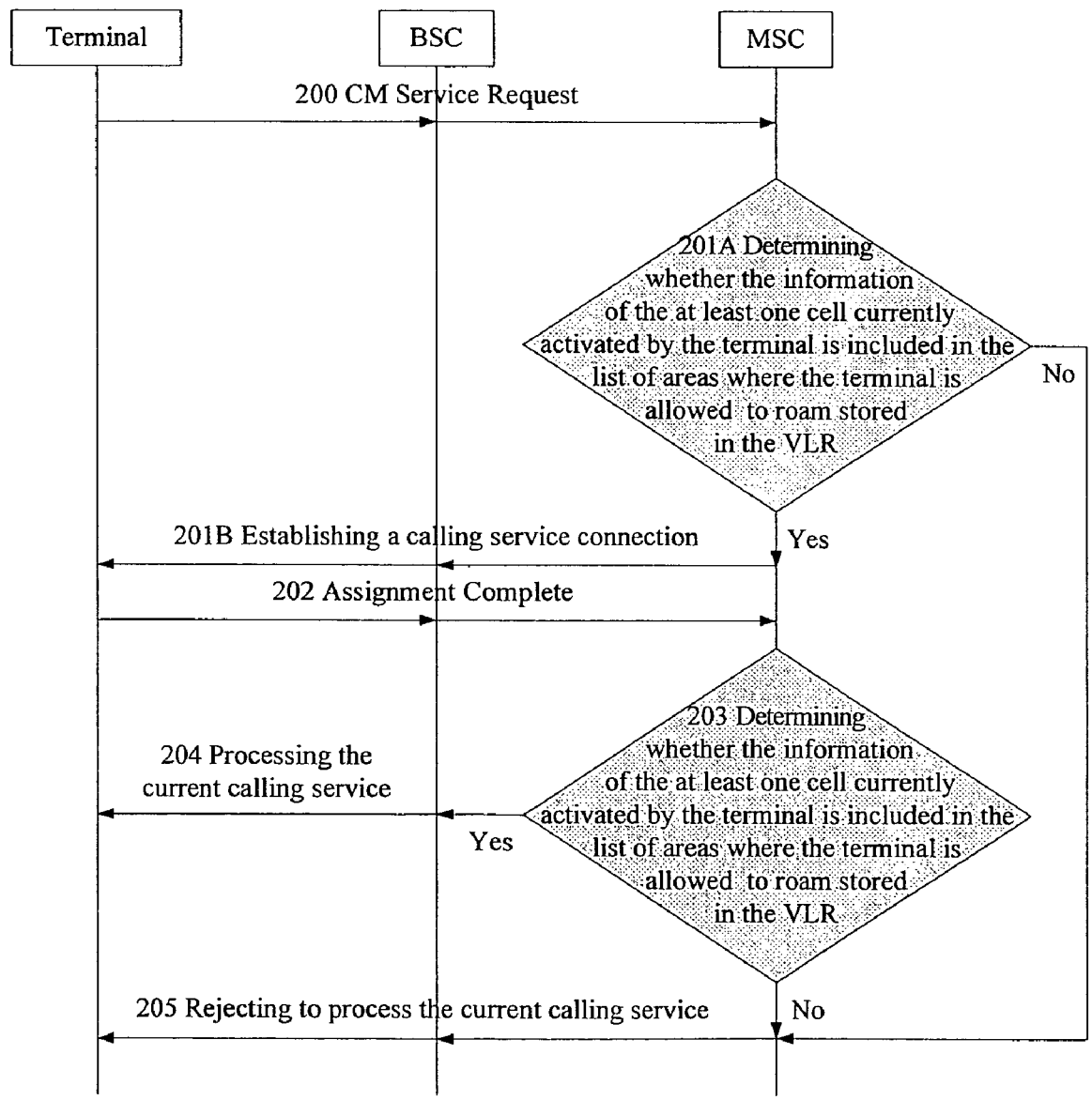
FIG. 2 is a flowchart illustrating the procedure of performing roam restriction on the terminal when it starts calling, according to an embodiment of the present invention.

When the terminal starts a call, the procedure of performing roam restriction on the terminal is as shown in FIG. 2:

step 200: the terminal sends a CM Service Request to the MSC that serves it, through the Base Station Controller (BSC) of the area where the terminal is currently located; the CM Service request carries the information of at least one cell currently activated by the terminal;

step 201A: after receiving the CM Service Request, the MSC determines whether the at least one cell currently activated by the terminal is included in the list of areas where the terminal is allowed to roam stored in VLR in advance, if yes, executes step 201B; otherwise, executes step 205;

step 201B: the MSC establishes a calling service connection from the wireless communication network side to this terminal through the BSC;

step 202: after the calling service connection is successfully established, this terminal will send an Assignment Complete message to the MSC through the BSC, wherein the message indicates that the radio channel and A interface channel are both successfully established, and will provide the MSC the information of the at least one cell currently activated by the terminal. In fact, the information of the at least one cell currently activated by the terminal, such as cell identifiers of these cells, can be transmitted to the MSC in the Assignment Complete message;

step 203: after receiving the Assignment Complete message that carries the information of the at least one cell currently activated by the terminal, the MSC determines whether the at least one cell currently activated by the terminal is included in the list of areas where the terminal is allowed to roam stored in VLR in advance, if yes, executes step 204; otherwise, executes step 205; the cells included in the list of areas where the terminal is allowed to roam can be identified by the cell identifiers, in this way, the whole determining procedure is to determine whether there is a cell identifier of an activated cell matching a certain cell identifier included in this list of areas where the terminal is allowed to roam;

step 204: the MSC processes the current calling started by the terminal according to the prior art, through the cell currently activated by the terminal and included in the list of areas where the terminal is allowed to roam;

step 205: the MSC rejects to process the current calling service started by this terminal.

When the MSC receives the CM Service Request, as to the above-noted determining procedure of step 201A and that of step 203, either one procedure is selected and executed, or both procedures are executed. Thereby repeated determinations are performed as described above when both are selected. Alternatively, the activated at least one cell may be all the activated cells. Therefore, the BSC may sort order for the selected activated cells, either the at least one cell or all the cells, according to a certain predefined rule, such as according to the signal intensity, and select the information of part of or all the activated cells to be carried in the related messages.

Figure 3:
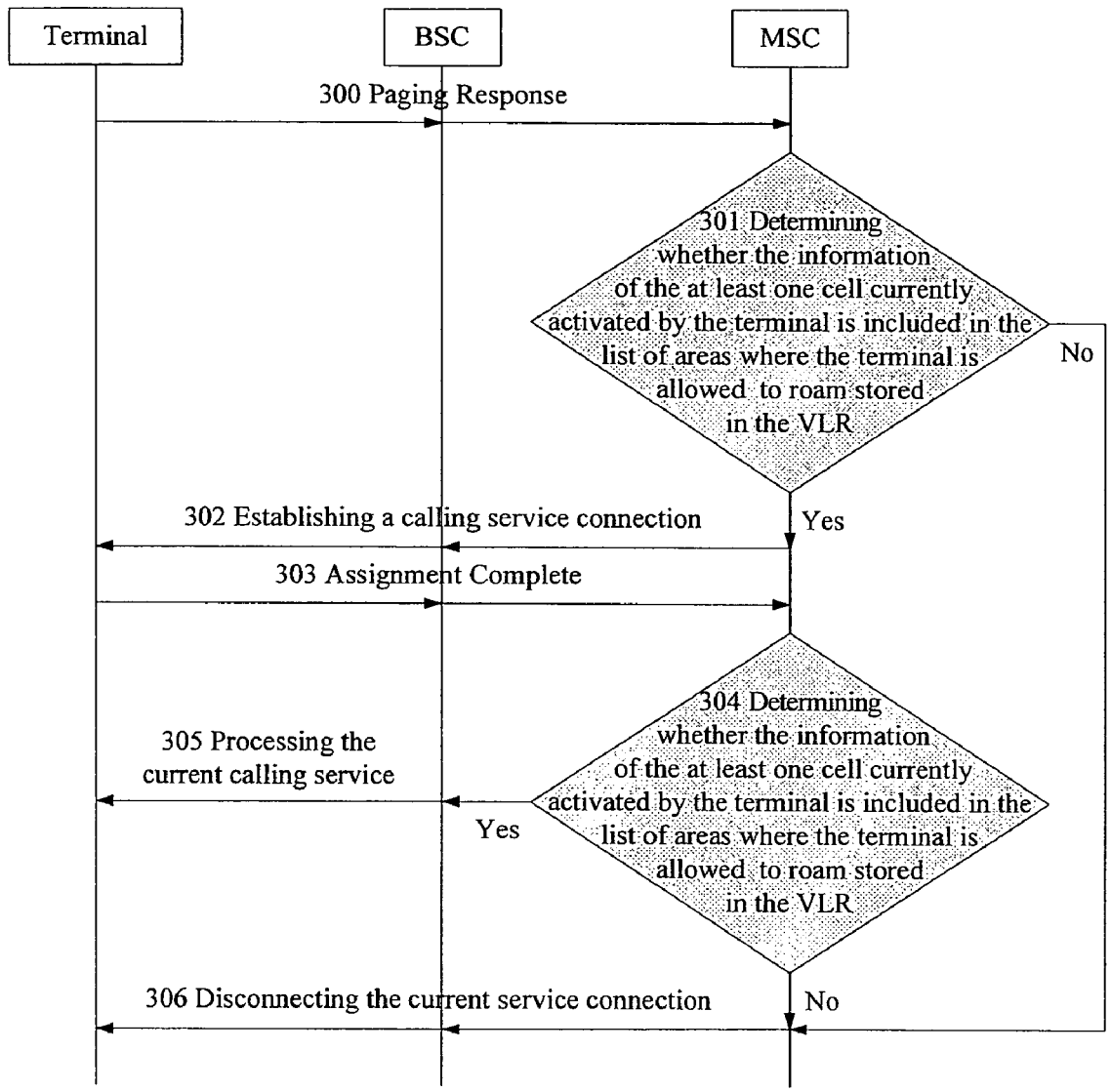
FIG. 3 is a flowchart illustrating the procedure of performing roam restriction on the terminal when it is being called, according to an embodiment of the present invention.

When the terminal is called, the procedure of performing roam restriction on the terminal is as shown in FIG. 3:

step 300: after receiving a being called service message, the terminal will send a Paging Response to the MSC that serves this terminal through the BSC that controls the current cell, wherein the Paging Response carries the information of at least one cell currently activated by the terminal;

step 301: after receiving the Paging Response that carries the information of the at least one cell currently activated by the terminal, the MSC will determine whether the at least one cell currently activated by the terminal is included in the list of areas where the terminal is allowed to roam pre-stored in the VLR, if yes, executes step 302; otherwise, executes step 306;

step 302: the MSC establishes a being called service connection from the wireless communication network side to the terminal through the BSC;

step 303: after the being called service connection is successfully established, the terminal will send an Assignment Complete message for processing the being called service to the MSC through the BSC, wherein the message carries the information of the at least one cell currently activated by the terminal;

step 304: after receiving the Assignment Complete message that carries the information of the at least one cell currently activated by the terminal, the MSC determines whether the at least one cell currently activated by the terminal is included in the list of areas where the terminal is allowed to roam pre-stored in the VLR, if yes, executes step 305; otherwise, executes step 306;

step 305: the MSC processes this terminal's being called service according to the prior art, through the cell currently activated by the terminal and included in the list of areas where the terminal is allowed to roam;

step 306: the MSC disconnects the service connection after playing notification or sending a prompt message to the calling terminal.

When the terminal is being called, as to the above-noted determining procedure of step 301 and that of step 304, either one procedure is selected and executed, or both procedures are executed. Thereby repeated determinations are performed as described above when both are selected. Alternatively, the activated at least one cell may be all the activated cells. Therefore, the BSC may sort order for the selected activated cells, either the at least one cell or all the cells, according to a certain predefined rule, such as according to the signal intensity, and select the information of part of or all the activated cells to be carried in the related messages.

Figure 4:
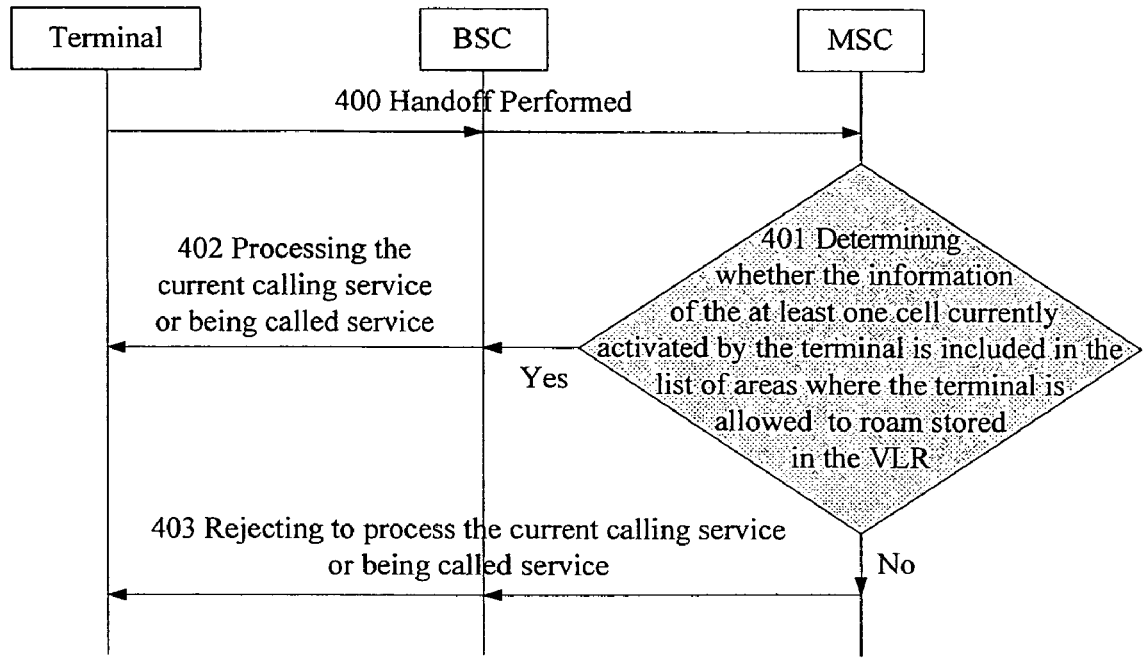
FIG. 4 is a flowchart illustrating the procedure of performing roam restriction on the terminal when Base Station Controller (BSC)-based handoff happens, according to an embodiment of the present invention.

When the terminal starts a call or is called, the BSC-based handoff may happen due to the terminal's movement, in this case, the procedure of performing roam restriction on the terminal is as shown in FIG. 4:

step 400: when the BSC-based handoff happens to the terminal, the terminal will send a Handoff Performed request message to the MSC that serves it, through the BSC that controls the area where the terminal is currently located, wherein this message carries the information of at least one cell currently activated by the terminal;

step 401: after receiving the Handoff Performed message that carries the information of the at least one cell currently activated by the terminal, the MSC will determine whether the at least one cell currently activated by the terminal is included in the list of areas where the terminal is allowed to roam pre-stored in the VLR, if yes, executes step 402; otherwise, executes step 403;

step 402: the MSC processes this terminal's calling service or being called service according to the prior art, through the cell currently activated by the terminal and included in the list of areas where the terminal is allowed to roam;

step 403: the MSC disconnects the current calling service connection of the terminal, or the MSC disconnects the current calling service connection of the terminal after playing notification or sending a prompt message to the calling terminal.

Alternatively, the activated at least one cell may be all the activated cells. Therefore, the BSC may sort order for the selected activated cells, either the at least one cell or all the cells, according to a certain predefined rule, such as according to the signal intensity, and select the information of part of or all the activated cells to be carried in the related messages.

When the terminal needs to send or receive a short message, the roam restriction can also be implemented on the terminal.

Figure 5:
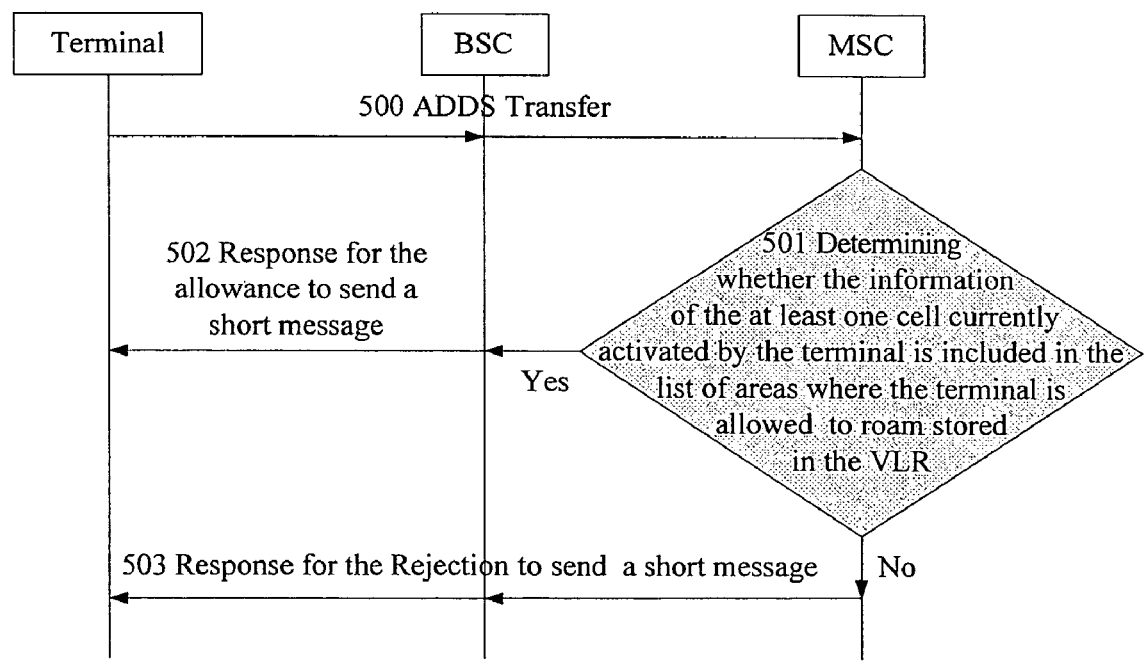
FIG. 5 is a flowchart illustrating the procedure of performing roam restriction on the terminal when it is sending a short message, according to an embodiment of the present invention.

When the terminal needs to send a short message, it could send an ADDS Transfer message, an ADDS Deliver message, a CM Service Request or an Assignment Complete message to the MSC. In this embodiment, the procedure of performing roam restriction on the terminal for sending or receiving a short message is as shown in FIG. 5, wherein the sent message to the MSC is the ADDS Transfer message.

step 500: when needing to send a short message, the terminal will send an ADD Transfer message to the MSC that serves this terminal through the BSC that controls the area where the terminal is currently located, wherein the message carries the information of at least one cell currently activated by the terminal;

step 501: after receiving the ADD Transfer message that carries the information of the at least one cell currently activated by the terminal, the MSC will determine whether the at least one cell currently activated by the terminal is included in the list of areas where the terminal is allowed to roam pre-stored in the VLR, if yes, executes step 502; otherwise, executes step 503;

step 502: the MSC processes this terminal's service of sending a short message according to the prior art, through the cell currently activated by the terminal and included in the list of areas where the terminal is allowed to roam; step 503: the MSC performs the roam restriction and disconnects the service connection after playing notification or sending a prompt message to the calling terminal.

The procedure of performing roam restriction on a terminal by sending an ADDS Deliver message, a CM Service Request or an Assignment Complete message is similar to that by sending an ADDS Transfer message as shown in FIG. 5, wherein the type of the message is different. Therefore, the procedures will not be described in detail.

Alternatively, the activated at least one cell may be all the activated cells. Therefore, the BSC may sort order for the selected activated cells, either the at least one cell or all the cells, according to a certain predefined rule, such as according to the signal intensity, and select the information of part of or all the activated cells to be carried in the related messages.

Figure 6:
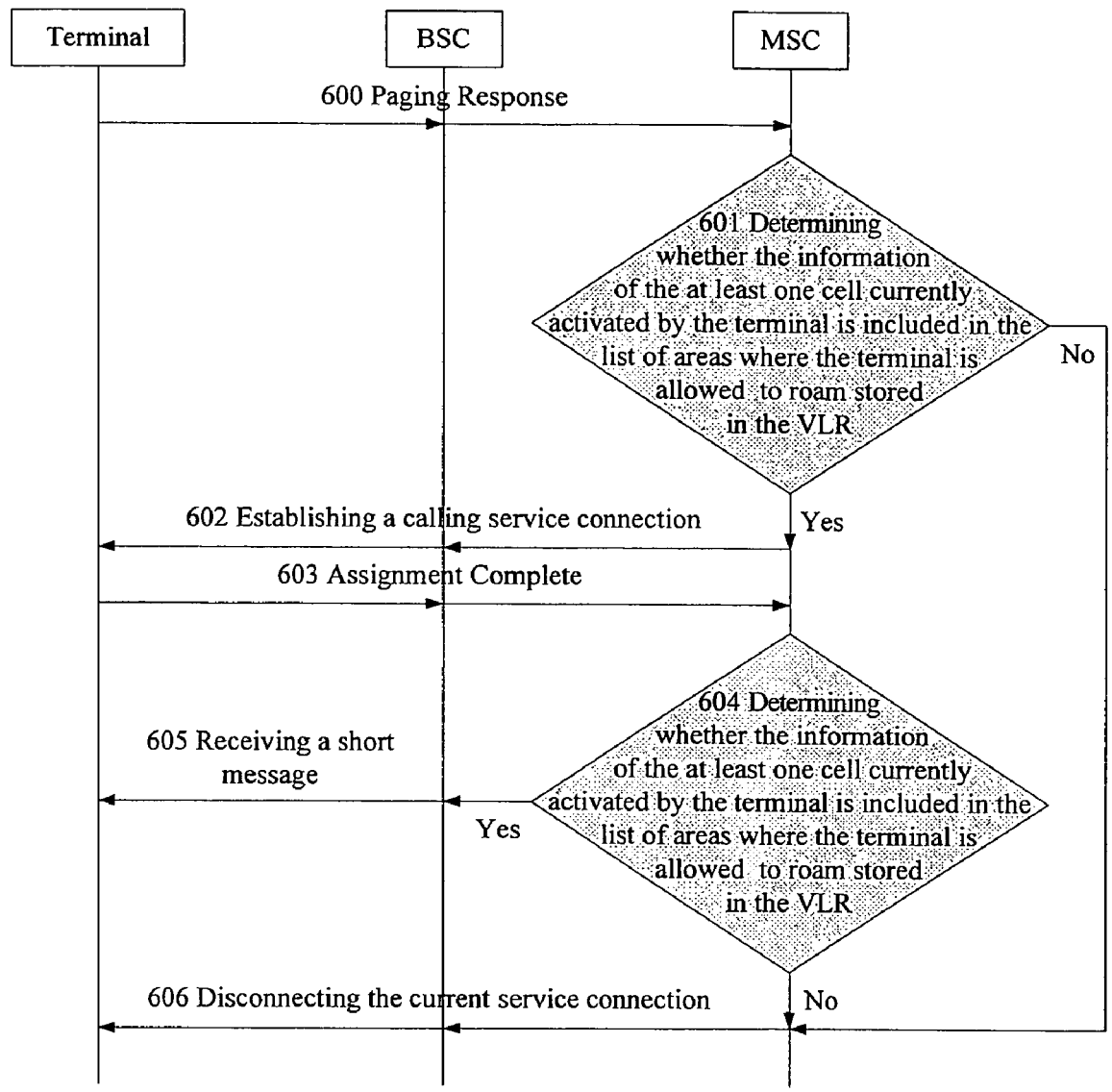
FIG. 6 is a flowchart illustrating the procedure of performing roam restriction on the terminal when it is receiving a short message, according to an embodiment of the present invention.

When the terminal needs to receive a short message, the procedure of performing roam restriction on the terminal is as shown in FIG. 6:

step 600: after receiving the notification for a short message, the terminal will send a Paging Response to the MSC that serves this terminal, through the BSC that controls the area where the terminal is currently located, wherein the Paging Response carries the information of at least one cell currently activated by this terminal;

step 601: after receiving the Paging Response that carries the information of the at least one cell currently activated by this terminal, MSC will determine whether the at least one cell currently activated by the terminal is included in the list of areas where the terminal is allowed to roam pre-stored in the VLR, if yes, executes step 602; otherwise, executes step 606;

step 602: the MSC establishes a service connection from the wireless communication network side to the terminal through the BSC, so that this terminal can receive short messages;

step 603: after the service connection to receive short messages is successfully established, this terminal will send an Assignment Complete message for receiving short messages to the MSC through the BSC, wherein the Assignment Complete message carries the information of the at least one cell currently activated by this terminal;

step 604: after receiving the Assignment Complete message that carries the information of the at least one cell currently activated by this terminal, the MSC will determine whether the at least one cell currently activated by the terminal is included in the list of areas where the terminal is allowed to roam pre-stored in the VLR, if yes, executes step 605; otherwise, executes step 606;

step 605: the MSC controls this terminal to receive short messages according to the prior art, through the cell currently activated by the terminal and included in the list of areas where the terminal is allowed to roam;

step 606: the MSC disconnects the current calling service connection after playing notification or sending a prompt message to the calling terminal.

When the terminal is receiving short messages, the above-noted determination procedure of step 601 and that of step 604 are not both necessary. Either of them could be selected to be executed or both procedures are executed. Thereby repeated determinations are performed as described above when both are selected. Alternatively, the activated at least one cell may be all the activated cells. Therefore, the BSC may sort order for the selected activated cells, either the at least one cell or all the cells, according to a certain predefined rule, such as according to the signal intensity, and select the information of part of or all the activated cells to be carried in the related messages.

Handoff could be performed to the terminal when it is sending or receiving a short message, the handoff procedure is the same as that described in FIG. 4 and will not be described in detail.

The method for implementing roam restriction on the terminal will be illustrated in detail with reference to another embodiment as the following.

Figure 7:
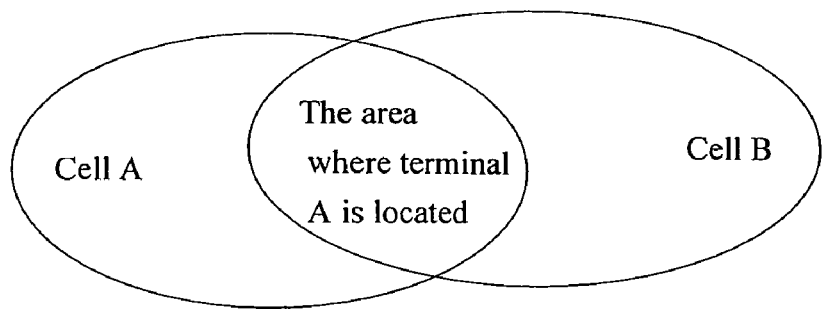
FIG. 7 is a schematic diagram illustrating the procedure of performing roam restriction on the terminal when the calling signal moves from the terminal's subscribed area to an unsubscribed area, according to an embodiment of the present invention.

FIG. 7 is a schematic diagram illustrating the procedure of performing roam restriction on the terminal when the calling signal moves from the terminal's subscribed area to an unsubscribed area, as shown in FIG. 7:

It is assumed that terminal A is confined to roam in cell A under MSC 1, namely terminal A will not be able to call or be called when it goes beyond cell A.

In this embodiment, first, an area of MSC1+cell A in which terminal A is confined to roam, is subscribed in the HLR; the HLR sends the list of areas where terminal A is allowed to roam, to the VLR of the MSC managing terminal A for storage.

When terminal A is located in cell A and if terminal A initiates or accepts a service, the BSC will notify the MSC that the current service area of terminal A is cell A. In this case, after the determination according to the list of areas where terminal A is allowed to roam stored in VLR, the MSC decides to accept the current service.

When terminal A is located in an overlapped area covered by both cell A and cell B, if terminal A initiates or accepts a service here, the BSC will notify the MSC that the current service area of terminal A is cell A and cell B. In this case, after the determination according to the list of areas where terminal A is allowed to roam stored in VLR, the MSC decides to accept the current service.

When terminal A is located in cell B, if terminal A initiates or accepts a service, the BSC will notify the MSC that the current service area of terminal A is cell B. In this case, after the determination according to the list of areas where terminal A is allowed to roam stored in VLR, the MSC will reject the current service.

Figure 8:
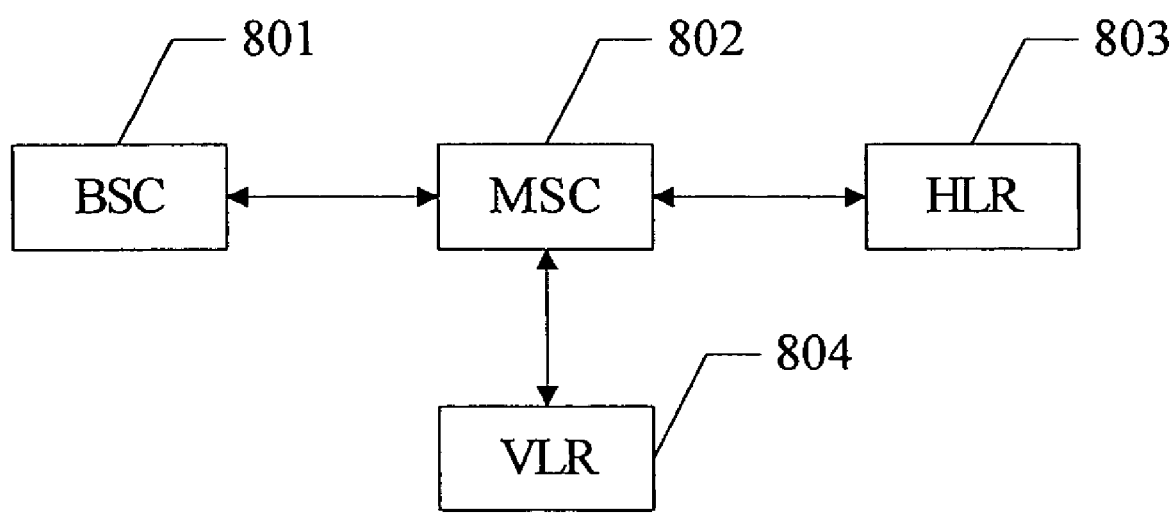
FIG. 8 is a schematic diagram illustrating the system for implementing roam restriction on the terminal, according to an embodiment of the present invention.

FIG. 8 is a schematic diagram illustrating the system for implementing roam restriction on the terminal, according to an embodiment of the present invention.

As shown in FIG. 8, the system includes interconnected BSC 801 and MSC 802 wherein BSC 801 sends to MSC 802 a terminal wireless service request message carrying the information of at least one cell currently activated by the terminal; MSC 802 receives the terminal wireless service request message and determines whether the at least one cell currently activated by the terminal is included in the list of areas where the terminal is allowed to roam, if yes, MSC 802 will send to BSC 801 a message to execute the requested service; otherwise, MSC 802 will send to BSC 801 a message to reject the requested service.

Alternatively, the activated at least one cell may be all the activated cells. Therefore, the BSC may sort order for the selected activated cells, either the at least one cell or all the cells, according to a certain predefined rule, such as according to the signal intensity, and select the information of part of or all the activated cells to be carried in the related messages.

The system may include HLR 803 which is connected with MSC 802 and is provided to store the list of areas where the terminal is allowed to roam. MSC 802 may obtain the list of areas where the terminal is allowed to roam through the message sent by HLR 803.

The system may include VLR 804 which is connected with MSC 802 and is provided to store the obtained list of areas where the terminal is allowed to roam.

As shown above, the provided method and system for implementing roam restriction on the terminal have the following advantages: better expandability, ability to implement roam restriction for single-sector region or single base station as well as multi-sector region or multi base station; no need to modify MSC system data or obtain special support from the terminal to reach the commercialized standard in case of network optimization, capacity expansion or migration; ability to enjoy the services of terminals located in an overlapped area covered by different base stations.

The above description just covers the preferred embodiments of the present invention and will not be used to restrict the present invention, any modification, equivalent replacement or improvement to the present invention according to the sprit and scope of the present invention as defined by the appended claims, is included within the protection scope of the present invention.

The invention claimed is:

1. A method for implementing roam restriction, a list of areas where a terminal is allowed to roam is set up, said method comprising:
   receiving, by a mobile switching center, a paging response from the terminal, wherein the paging response carries information of at least one cell currently activated by the terminal;
   determining, by the mobile switching center, whether the information of the at least one cell currently activated by the terminal carried in the paging response is included in the list of areas where the terminal is allowed to roam, if yes, establishing a calling service connection; otherwise, disconnecting the service connection;
   receiving, by the mobile switching center, an assignment complete message, wherein the assignment complete message carries information of at least one cell currently activated by the terminal; and
   determining, by the mobile switching center, whether the information of the at least one cell currently activated by the terminal carried in the assignment complete message is included in the list of areas where the terminal is allowed to roam, if yes, processing the terminal's called service, otherwise, disconnecting the service connection.

2. The method according to claim 1, wherein the list of areas where the terminal is allowed to roam is stored in a home location register.

3. The method according to claim 1, further comprising:
   receiving, by the mobile switching center, the list of areas where the terminal is allowed to roam returned by a home location register (HLR); and
   storing, by the mobile switching center, the list of areas where the terminal is allowed to roam in a visitor location register (VLR) that the mobile switching center belongs to.

4. The method according to claim 3, wherein the list of areas where the terminal is allowed to roam is carried in a qualification request response message returned by the home location register.

5. The method according to claim 3, wherein the list of areas where the terminal is allowed to roam is an updated list of areas where the terminal is allowed to roam, and the updated list of areas where the terminal is allowed to roam is carried in a modification message sent from the home location register.

6. The method according to claim 1, wherein the information of the at least one cell currently activated by the terminal comprises information of all cells currently activated by the terminal.

7. The method according to claim 1, wherein the information is a cell identifier to identify a cell.

8. A system for implementing roam restriction, comprising:
   interconnected Base Station Controller (BSC) and Mobile Switching Center (MSC),
   wherein the Base Station Controller is adapted to send to the Mobile Switching Center a paging response carrying the information of at least one cell currently activated by the terminal; the Mobile Switching Center is adapted to receive the terminal wireless service request message and determine whether the at least one cell currently activated by the terminal is included in the list of areas where the terminal is allowed to roam, if yes, establishing a calling service connection: otherwise disconnecting the service connection; the Mobile Switching Center receives an assignment complete message, wherein the assignment complete message carries information of the at least one cell currently activated by the terminal, and determines whether the information of the at least one cell currently activated by the terminal carried in the assignment complete message is included in the list of areas where the terminal is allowed to roam, if yes, processing the terminal's called service, otherwise, disconnecting the service connection.

9. The system according to claim 8, further comprising: a Home Location Register (HLR) which is connected with the Mobile Switching Center and is provided to store the list of areas where the terminal is allowed to roam, for the Mobile Switching Center to obtain the list of areas where the terminal is allowed to roam through a message sent by the Home Location Register.

10. The system according to claim 8, further comprising: a Visitor Location Register (VLR) which is connected with the Mobile Switching Center and is provided to store the list of areas where the terminal is allowed to roam.

11. The system according to claim 9, further comprising: a Visitor Location Register (VLR) which is connected with the Mobile Switching Center and is provided to store the list of areas where the terminal is allowed to roam.

12. The method according to claim 3, wherein the list of areas where the terminal is allowed to roam is carried in a location registration response message returned by the home location register.

13. The method of claim 1, wherein the step of receiving an assignment complete message occurs after the step of establishing a calling service connection.

14. The method of claim 3, further comprising:
   prompting the HLR to send an updated list of areas where the terminal is allowed to roam;
   receiving, by the mobile switching center, an updated list of areas where the terminal is allowed to roam from the HLR;
   deleting, by the mobile switching center, the stored list of areas where the terminal is allowed to roam in the VLR; and
   storing, by the mobile switching center, the updated list.

15. The method of claim 14, wherein the step of prompting the HLR occurs periodically.

16. The method of claim 14, wherein the step of prompting the HLR occurs as a result of a modification of the HLR.

17. The method of claim 1, further comprising selecting the activated cells to be carried in the paging response or the assignment complete message according to a predefined rule.

18. The method of claim 17, wherein the predefined rule requires that an activated cell's signal intensity exceed a minimum threshold.

* * * * *